July 15, 1924.
1,501,046
C. L. GOODRUM
AUTOMATIC CONTROL FOR CHARGING SECONDARY BATTERIES
Filed Dec. 22, 1920
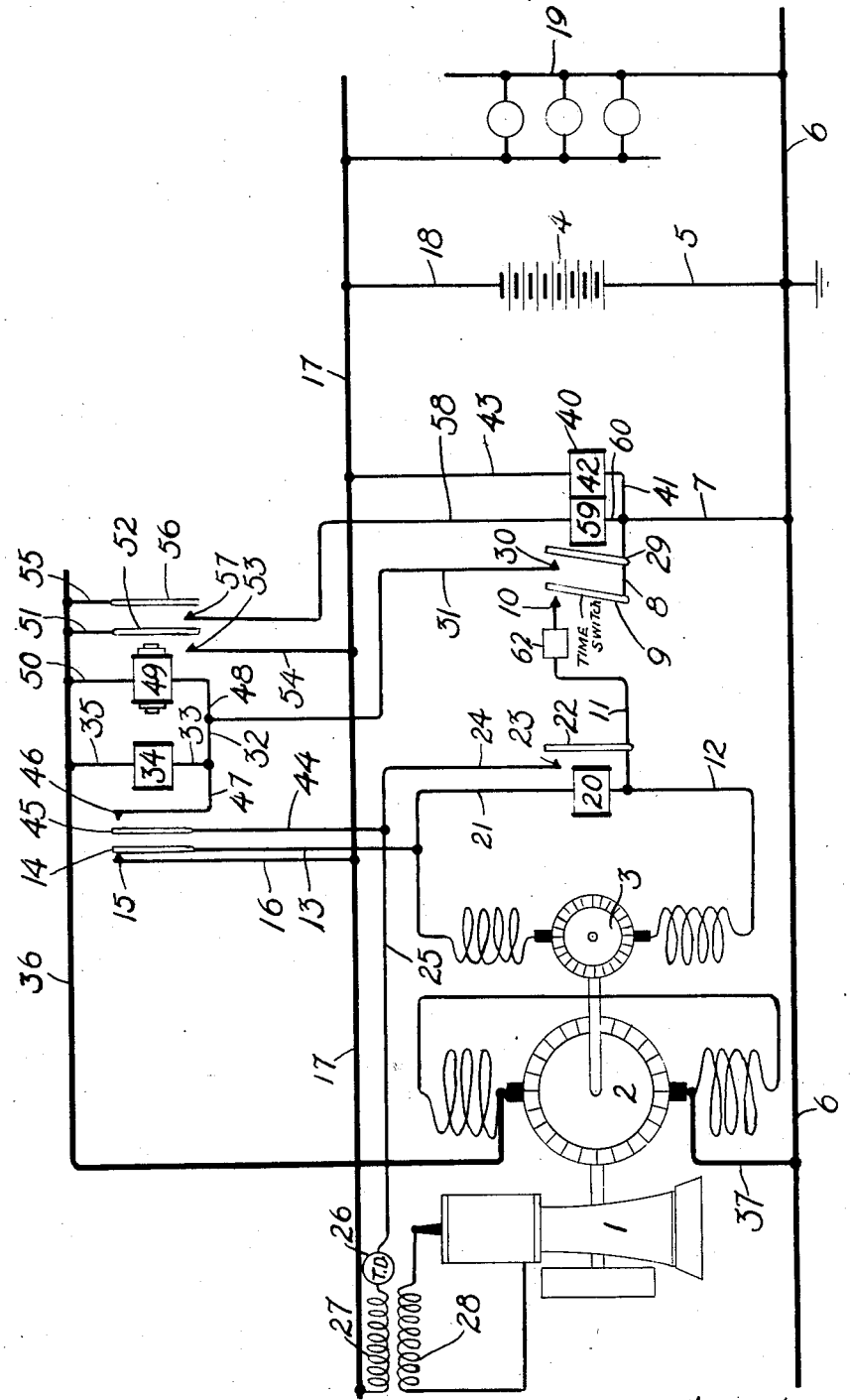
Inventor:
Charles L. Goodrum,
by Hubert A. Patterson.
Atty.

Patented July 15, 1924.

1,501,046

UNITED STATES PATENT OFFICE.

CHARLES L. GOODRUM, OF NEW YORK, N. Y., ASSIGNOR TO WESTERN ELECTRIC COMPANY, INCORPORATED, OF NEW YORK, N. Y., A CORPORATION OF NEW YORK.

AUTOMATIC CONTROL FOR CHARGING SECONDARY BATTERIES.

Application filed December 22, 1920. Serial No. 432,449.

*To all whom it may concern:*

Be it known that I, CHARLES L. GOODRUM, a citizen of the United States, residing at New York city, in the county of New York, State of New York, have invented certain new and useful Improvements in an Automatic Control for Charging Secondary Batteries, of which the following is a full, clear, concise, and exact description.

This invention relates to an automatic power and light system, and consists of a circuit and certain elements which cooperate with the circuit to automatically cause a current to pass through an electric accumulator for charging the same when its voltage falls to a point which is likely to impair the operation of certain translating devices depending upon it; and which will also cooperate to automatically interrupt the charging current at a time when the accumulator voltage advances to a point which suffices to answer ordinary service demands.

A further object of the invention consists in so arranging a prime mover ignition circuit that it can be energized from either one of two sources, its energization by one source or the other depending upon whether the system is in the process of being started or in full operation.

More specifically, the invention consists in an electrical system comprising a prime mover, an accumulator, electromagnetic machines and means responsive to the condition of the accumulator for starting and stopping the prime mover.

To these and other ends, the invention consists in certain combinations and arrangements of elements more fully described hereinafter; the novel features being pointed out in the claims appearing at the end of this specification.

The drawing illustrates the circuit of a system embodying the invention.

In carrying out the present invention, as illustrated in the drawing, means is employed in connection with an electric accumulator or secondary battery 4 and a load circuit 19 therefor, for charging the accumulator which is shown as consisting of a shunt wound dynamo 2 and a prime mover 1, such as an internal combustion engine for actuating the same. In order that the prime mover 1 may be properly started when conditions require, a series wound starting motor 3 is arranged for automatic connection to the battery 4, and a further arrangement is provided to bridge the ignition circuit 27—28 of the prime mover 1 across the battery 4, simultaneously with the operation of the starting motor 3. Circuit closing devices, such as relays 40 and 20 are provided for these purposes. It is likewise in accordance with the scheme of the invention to cut the starting motor 3 from its energizing source, battery 4, when the dynamo 2 starts to furnish current, or in case the prime mover for some reason fails to start, and to transfer the engine ignition circuit (27—28) from the battery 4 as a source of energy to the dynamo 2 as soon as the latter is supplying an efficient working current. As the generator 2 begins to supply a current sufficient for purposes of charging the accumulator 4, it is placed in a direct circuit with the same and also with a coil 59 of a main control or battery voltage relay 40. The charging system is then in operation and continues to operate until the accumulator 4 becomes charged, at which time the main control relay 40 is energized causing the entire charging system to revert to its former inactive condition, awaiting the time when the accumulator 4 again falls in voltage and further charging becomes imperative. This cycle of operations continues to repeat itself indefinitely, so that the generating system needs only to be supplied with fuel and to be maintained in a state of repair.

The various functions and parts of the circuit will be better understood from a description of the detailed operation of the system, which comprises a series of operations which, for convenience, are treated in this specification under the sub-divisions of Automatic starting, Charging the battery, and Automatic stopping.

In the diagrammatical illustration, the charging circuit is shown in an inoperative condition, the prime mover and the dynamo electric machines being stationary. The battery 4 is supplying the load circuit 19 and is also serving to energize a low voltage winding 42 of the main control relay 40 which, when the battery voltage falls to a predetermined point, becomes too weak to retain the armatures 9 and 29 in attracted positions.

Automatic starting.

As the battery 4, which is supplying a series of translating devices 19 falls in voltage to a value which is predetermined by means of the low voltage winding 42 of the main control relay 40, this winding being the only winding of the main control relay in circuit at this time, the relay is deenergized. The two armatures 9 and 29 drop back and the starting motor and the engine ignition circuits are closed in the following manner.

The starting motor circuit completed by the closing of the armature 9 against the contact 10 is as follows:

From one side battery 4, conductors 5—6—7—8, armature 9, contact 10, time switch 62, conductors 11—12, starting motor, 3, conductor 13, armature 14, contact 15, conductors 16—17—18, back to the other side of the battery.

The engine ignition circuit, closed by the energization of relay 20 which is in shunt of the starting motor circuit, is as follows:

From one side of the battery 4, conductors 5—6—7—8, armature 9, contact 10, time switch 62, conductor 11, armature 22, contact 23, conductors 24—25, timer 26, primary ignition coil 27, conductors 17—18 to the other side of the battery 4.

The closing of the main control relay armature 29 against contact 30 does not perform a starting function and will therefore be treated in detail in connection with subsequent operations.

The starting motor 3 operates for a time sufficient to start the prime mover, but if for any reason the prime mover fails to start, the circuit for the motor 3, after a predetermined interval of time, is broken. A time switch 62 performs this latter function in a well known manner. After the prime mover has started, the charging dynamo electric machine 2 will be set in motion.

Charging the battery.

As soon as the dynamo 2 begins to furnish current, a relay 34 is energized which, withdrawing its armature 14 from the contact 15 breaks the circuit for the starting motor 3, causing a deenergization of the relay 20, in shunt thereof, which releasing its armature 22 breaks the ignition circuit.

The circuit for the starting motor cut-out relay 34 is as follows:

From one side of the dynamo 2, conductors 6—7—8, armature 29, contact 30, conductors 31—32—33, starting motor cut-out relay 34, conductors 35—36, to the other side of the dynamo 2.

It will be remembered that for starting purposes the primary coil 28 of the engine ignition system was energized by the battery 4. As this battery ignition circuit is now opened, by the deenergization of relay 20 which releases its armature 22, another ignition circuit is closed which may be traced as follows: battery 4, conductors 5, 6 and 7, armature 29, contact 30, conductors 31, 32 and 47, contact 46, armature 45, conductors 44 and 25, timer 26, primary induction coil 27, conductors 17 and 18, back to the battery.

The starting motor has now reverted to an idle condition, the system is in full operation and the dynamo is engaged in building up a current sufficient for battery charging purposes. As this current reaches the required amount, it energizes a battery charging relay 49, which is provided with a maximum voltage winding, over the following circuit:

From conductor 31 which is connected to one side of the dynamo 2, conductor 48, battery charging relay 49, conductors 50—36, to the other side of the dynamo 2. The armatures 52 and 56 of this relay close two distinct circuits, one of which places the battery 4 in a direct circuit with the dynamo 2. The second circuit will be referred to later.

The dynamo-battery circuit established when the armature 52 comes into engagement with the contact 53 is as follows:

From one side of the dynamo 2, conductors 37, 6, 5, battery 4, 18, 17, 54, 53, 52, 51, 36 back to dynamo 2. The ignition circuit is now energized by the dynamo 2, over a circuit from conductors 37, 6 and 7, armature 29, contact 30, conductors 31, 32 and 47, contact 46, armature 45, conductors 44 and 25, timer 26, primary induction coil 27, conductors 17 and 54, contact 53, armature 52, conductors 51 and 36, back to dynamo 2. The system is now charging the battery and simultaneously supplying any translating devices that may be in use at this time and it will continue to charge the battery until the desired voltage has been reached when the ignition circuit of the prime mover will be broken automatically and the system stopped.

Automatic stopping.

In the description above, reference was made to a circuit established by the engagement of the armature 56 and the contact 57. This is a circuit which includes the coil 59 of the main control relay 40, which gives this relay 40 its maximum voltage characteristic. The coil 59 is only in circuit while the dynamo is charging the battery or supplying the translating devices.

The circuit of coil 59 is as follows:

From one side of dynamo 2, conductors 37, 6, 7 and 60, coil 59 of relay 40, conductor 58, contact 57, armature 56, conductors 55 and 36, back to dynamo 2. The coils 59 and 42 of the main control relay 40, both of which are being energized by the dynamo while the system is in full operation, are cumulative in their effect.

The circuit of the coil 42 while the system is in full operation is as follows:

From one side of the dynamo 2, conductors 37, 6, 7 and 41, coil 42 of relay 40, conductors 43, 17 and 54, contact 53, armature 52, conductors 51 and 36 back to dynamo 2. The coils 42 and 59 of main control relay 40 are in shunt of the accumulator in the dynamo-battery circuit so that the current flowing through these coils will increase as the battery 4 becomes charged, since the internal resistance of the battery 4 will increase with its increased charge, forcing more current through these shunt circuits. When the battery 4 reaches a fully charged condition, all of the current in the dynamo-battery circuit will pass through the coils 42 and 59 so that the effect of these coils will be sufficient to pull up the armatures of the relay 40, breaking the engine ignition circuit at 29—30 and preventing any further energization of this circuit from the starting motor by breaking the battery circuit at 9—10.

The charging system now ceases to operate, the armatures of the various relays returning to the positions in which they are illustrated in the drawing. The translating devices 19 and the coil 42 of the main control relay 40 continue in circuit with the battery 4 until the voltage of the latter again falls, so that the coil 42 is weakened to a degree where it can no longer retain the armatures 9 and 29 and the various circuits are again established for starting the prime mover.

What is claimed is:

1. An electric system comprising an accumulator, a dynamo electric machine for charging said accumulator, a prime mover for actuating said dynamo electric machine, an ignition system, means for starting said prime mover, a circuit including said accumulator and said dynamo electric machine, a relay having two windings cooperating to control the operation of said circuit, one of said windings being normally in circuit with said accumulator and also adapted to be energized by said dynamo, and the other of said windings adapted to be energized only by said dynamo, a circuit including said accumulator and said starting means; a circuit including said dynamo electric machine and said ignition system; and a main control relay for said circuits.

2. An electric system comprising an accumulator, a dynamo electric machine for charging said accumulator, a prime mover for operating said dynamo, a starting motor for starting said prime mover, a control relay having two windings cumulative in effect, one of said windings being normally energized by said accumulator, a normally open energizing circuit for said starting motor controlled by said relay and adapted to be closed when the voltage in said accumulator falls below a predetermined value, a relay controlled by the operation of said dynamo for stopping said starting motor, a normally open charging circuit including said dynamo and said accumulator, and a relay controlled by the operation of said dynamo for closing said charging circuit and for connecting the other of said windings of said control relay in shunt of said accumulator in said charging circuit.

In witness whereof I hereunto subscribe my name this 20th day of December, A. D. 1920.

CHARLES L. GOODRUM.